(12) United States Patent
Roucka

(10) Patent No.: US 8,662,216 B2
(45) Date of Patent: Mar. 4, 2014

(54) VARIABLE-WIDTH VEHICLE

(75) Inventor: Stanislav Roucka, Dobris (CZ)

(73) Assignee: Clark Eqipment Company, West Fargo, ND (US)

( * ) Notice: Subject to any disclaimer, the term of this patent is extended or adjusted under 35 U.S.C. 154(b) by 496 days.

(21) Appl. No.: 12/049,037

(22) Filed: Mar. 14, 2008

(65) Prior Publication Data

US 2009/0229894 A1   Sep. 17, 2009

(51) Int. Cl.
*B62D 55/084* (2006.01)

(52) U.S. Cl.
CPC .................................. *B62D 55/084* (2013.01)
USPC ........................................ 180/9.48; 180/9.46

(58) Field of Classification Search
USPC ........................................ 180/9.46, 9.48, 9.5
See application file for complete search history.

(56) References Cited

U.S. PATENT DOCUMENTS

| | | | | |
|---|---|---|---|---|
| 2,694,581 A | * | 11/1954 | Helmle | .......................... 180/9.54 |
| 3,205,961 A | | 9/1965 | Nolte | |
| 3,712,398 A | | 1/1973 | Althaus | |
| 3,749,793 A | * | 7/1973 | Blase et al. | .................... 514/467 |
| 3,820,616 A | | 6/1974 | Juergens | |
| 3,894,598 A | * | 7/1975 | Yeou | .............. 180/9.48 |
| 4,132,317 A | | 1/1979 | Arendt et al. | |
| 4,341,276 A | * | 7/1982 | Furuichi | ...................... 180/9.48 |
| 4,386,673 A | * | 6/1983 | Carter et al. | ................... 180/9.1 |
| 4,431,074 A | | 2/1984 | Langerud | |
| 4,830,562 A | | 5/1989 | Frederking | |
| 5,598,896 A | | 2/1997 | Haest | |
| 5,638,908 A | | 6/1997 | Masumoto et al. | |
| 5,901,800 A | * | 5/1999 | Wilson et al. | ................. 180/9.48 |
| 6,012,724 A | * | 1/2000 | Pitkanen | .................... 280/6.155 |
| 6,145,610 A | | 11/2000 | Gallignani | |
| 6,394,204 B1 | * | 5/2002 | Haringer | ...................... 180/9.52 |

FOREIGN PATENT DOCUMENTS

| | | |
|---|---|---|
| EP | 0 705 944 A1 | 4/1996 |
| EP | 1 325 861 A1 | 7/2003 |
| EP | 1442968 A1 | 8/2004 |
| EP | 1632132 A2 | 3/2006 |
| WO | 94/22706 A | 10/1994 |

OTHER PUBLICATIONS

Search Report and Written Opinion dated Jul. 2, 2009 for International application No. PCT/US2009/001559, filed Mar. 12, 2009.
Communication from EPO dated Oct. 26, 2010 for European application No. 09719658.8, filed Mar. 12, 2009.

(Continued)

*Primary Examiner* — Anne Marie Boehler
*Assistant Examiner* — Maurice Williams
(74) *Attorney, Agent, or Firm* — John D. Veldhuis-Kroeze; Westman, Champlin & Koehler, P.A.

(57) ABSTRACT

A construction vehicle includes first and second track assemblies. The track assemblies each include an inner portion, and outer portion and a middle portion between the inner portion and the outer portion. An adjustment mechanism is pivotably coupled to the middle portions of the first and second track assemblies. The adjustment mechanism extends and retracts along a width axis to adjust a distance between the first and second track assemblies. The width of the first and second track assemblies can determine an overall width of the construction vehicle.

16 Claims, 8 Drawing Sheets

(56) References Cited

OTHER PUBLICATIONS

Office Action dated Nov. 24, 2011 issued in Chinese patent application No. 200980108909.6, filed Mar. 12, 2009, 16 pages including English translation.

Office Action with English translation attached dated Aug. 31, 2012 issued in Chinese patent application No. 200980108909.6, filed Mar. 12, 2009, 11 pages.

Communication dated Mar. 29, 2012 in European application No. 09719658.8, filed Mar. 12, 2009, 5 pages.

* cited by examiner

VARIABLE-WIDTH VEHICLE

BACKGROUND

The present invention relates to a tracked construction vehicle that can adjust from a wide width to a narrow width.

SUMMARY

In one embodiment, the invention provides a track assembly for a construction vehicle including a first track assembly and a second track assembly. The first track assembly includes a first track and a drive track unit for driving movement of the first track. The first track assembly has an inner portion, an outer portion, and a middle portion between the inner portion and the outer portion. The second track assembly includes a second track and a drive track unit for driving movement of the second track. The second track assembly has an inner portion, an outer portion, and a middle portion between the inner portion and the outer portion. The second track assembly is spaced apart from first track assembly along a first axis. The track assembly also includes an adjustment mechanism coupled to the first track assembly and to the second track assembly. The adjustment mechanism is coupled to the middle portions of the first and second track assemblies. The adjustment mechanism is capable of extending and retracting along an axis parallel to the first axis to increase and decrease the spacing between the first track assembly and the second track assembly along the first axis. The adjustment mechanism is coupled to the middle portion of the first track assembly.

In another embodiment, the invention provides a construction vehicle including a frame, an operator support supported on the frame for rotation relative to the frame about a vertical axis, an upper attachment pivotably mounted to the frame and a track assembly for supporting the frame for movement over the ground. The track assembly includes a first track assembly including a first track and a drive track unit for driving movement of the first track. The first track assembly has an inner portion, an outer portion, and a middle portion between the inner portion and the outer portion. The track assembly includes a second track assembly including a second track and a drive track unit for driving movement of the second track. The second track assembly has an inner portion, an outer portion, and a middle portion between the inner portion and the outer portion. The second track assembly is spaced apart from first track assembly along a first axis. The track assembly also includes an adjustment mechanism coupled to the first track assembly and to the second track assembly. The adjustment mechanism is capable of extending and retracting along an axis parallel to the first axis to increase and decrease the spacing between the first track assembly and the second track assembly along the first axis. The adjustment mechanism is coupled to the middle portion of the first track assembly.

In another embodiment, the invention provides a method of adjusting a width of a tracked vehicle along a first axis, the tracked vehicle of the type having a left track assembly and a right track assembly spaced apart from one another along the first axis. A first end of an adjustment mechanism is coupled to a middle portion of the left track assembly and a second end of the adjustment mechanism is coupled to a middle portion of the right track assembly. The first end of the adjustment mechanism is moved away from the second end of the adjustment mechanism along the first axis. A first outwardly directed force is exerted on the middle portion of the left track assembly parallel to the first axis and a second outwardly directed force is exerted on the middle portion of the right track assembly opposite to the first outwardly directed force and parallel to the first axis. The first track assembly and the second track assembly are moved away from one another parallel to the first axis under the influence of the adjustment mechanism from a retracted configuration to an extended configuration.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
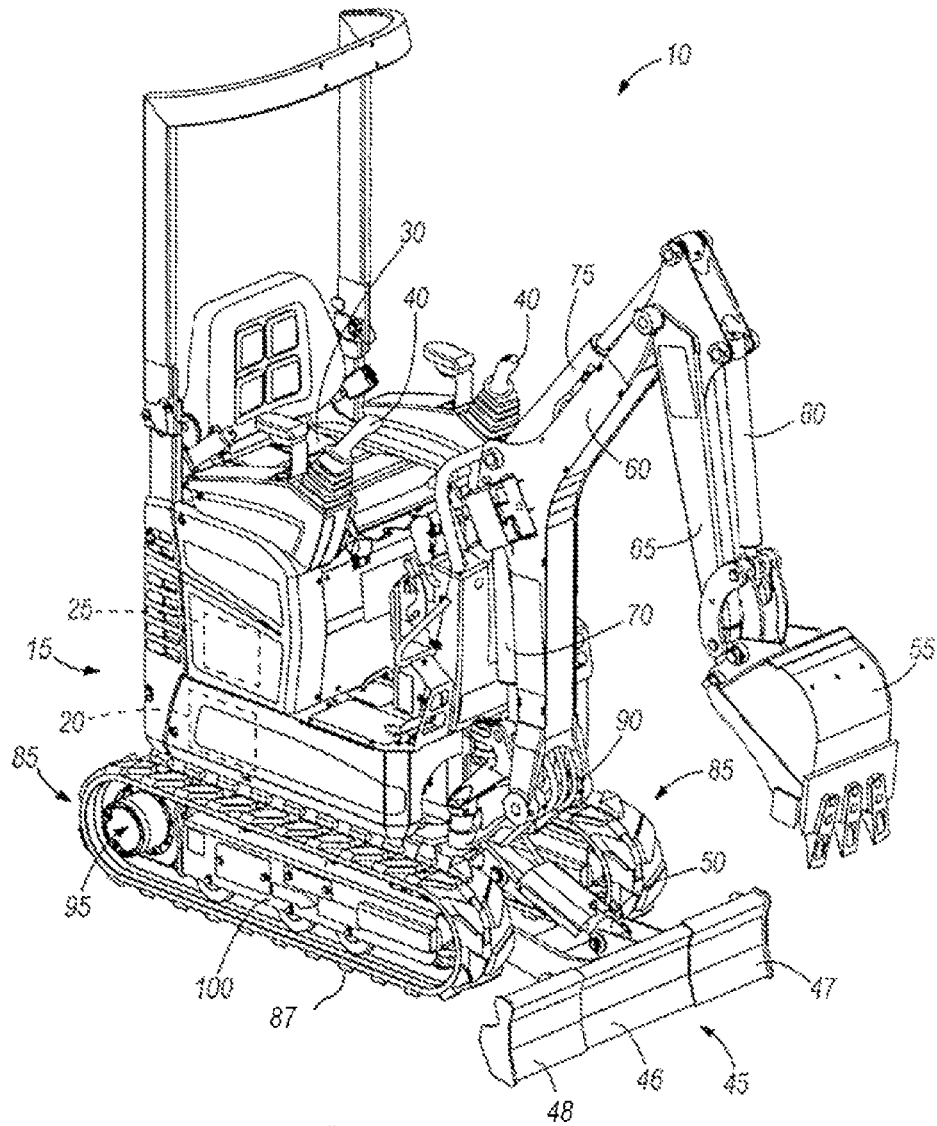
FIG. 1 is a perspective view of a construction vehicle according to one embodiment of the present invention.

FIG. 1 illustrates an excavator-type construction vehicle 10 that is compact and can be referred to as a mini excavator. The excavator 10 includes a body 15 supporting an engine 20 and a hydraulic system 25. The engine 20 and hydraulic system 25 provide power and hydraulic fluid to move and operate the excavator 10. The engine 20 and hydraulic system 25 can be positioned on and supported by one or more frame members 35 (shown more clearly in FIGS. 2 and 8). A plurality of operator manipulable controls, such as the illustrated joysticks 40, are positioned adjacent an operator support 30 to control operation of the excavator 10.

A lower attachment, such as the illustrated dozer blade 45, is pivotably coupled to the frame member 35. A dozer lift cylinder 50 is coupled between the frame member 35 and the dozer blade 45 for pivoting the dozer blade 45 with respect to the frame member 35. The dozer blade 45 is positioned in front of the excavator 10 to help create a smooth path of travel and to perform other tasks.

The dozer blade 45 includes a middle portion 46 that is coupled to the frame member 35 and left and rights side portions 47 and 48 that are moveable with respect to the middle portion 46. Left and right actuators (not shown) are coupled between the middle portion 46 and the respective left and right side portions 47 and 48. The left and right side portions 47, 48 are movable under the influence of the left and right actuators to move toward and away from the middle portion 46, thereby increasing and decreasing the overall width of the blade 45. The dozer blade 45 can be wider than the vehicle 10 if necessary (i.e., during use), but can retract to be as narrow or narrower than the vehicle 10 for traveling through narrow openings such as doorways.

An upper attachment, such as the illustrated bucket 55, is coupled to the frame member 35 by a boom arm 60 and an attachment arm 65. The boom arm 60 is pivotably coupled to the frame member 35 and is pivoted about the frame member 35 by a first lift cylinder 70. The attachment arm 65 is pivotably coupled to the boom arm 60 and is pivoted about the boom arm 60 by a second lift cylinder 75. The bucket 55 is pivotably coupled to the attachment arm 65 and is pivoted about the attachment arm 65 by a tilt cylinder 80.

The excavator 10 further includes left and right track assemblies 85 that are operable to support and move the excavator 10. The track assemblies 85 each include a track 87 that moves along a surface to move the excavator 10 and a track drive unit 95 for driving movement of the tracks 87. The engine 20 and the hydraulic system 25 provide power to left and right track drive units 95 through a plurality of conduits 90. The track drive units 95 can be motors or any other similar power generator that can receive an input of pressurized fluid and generate an output of mechanical movement. The track drive units 95 drive the left and right tracks assemblies 85 to move the excavator 10 over a ground surface. The track assemblies 85 can further include a frame plate 100 to at least partially cover the interior of the track assemblies 85 to inhibit entry of debris.

Figure 2:
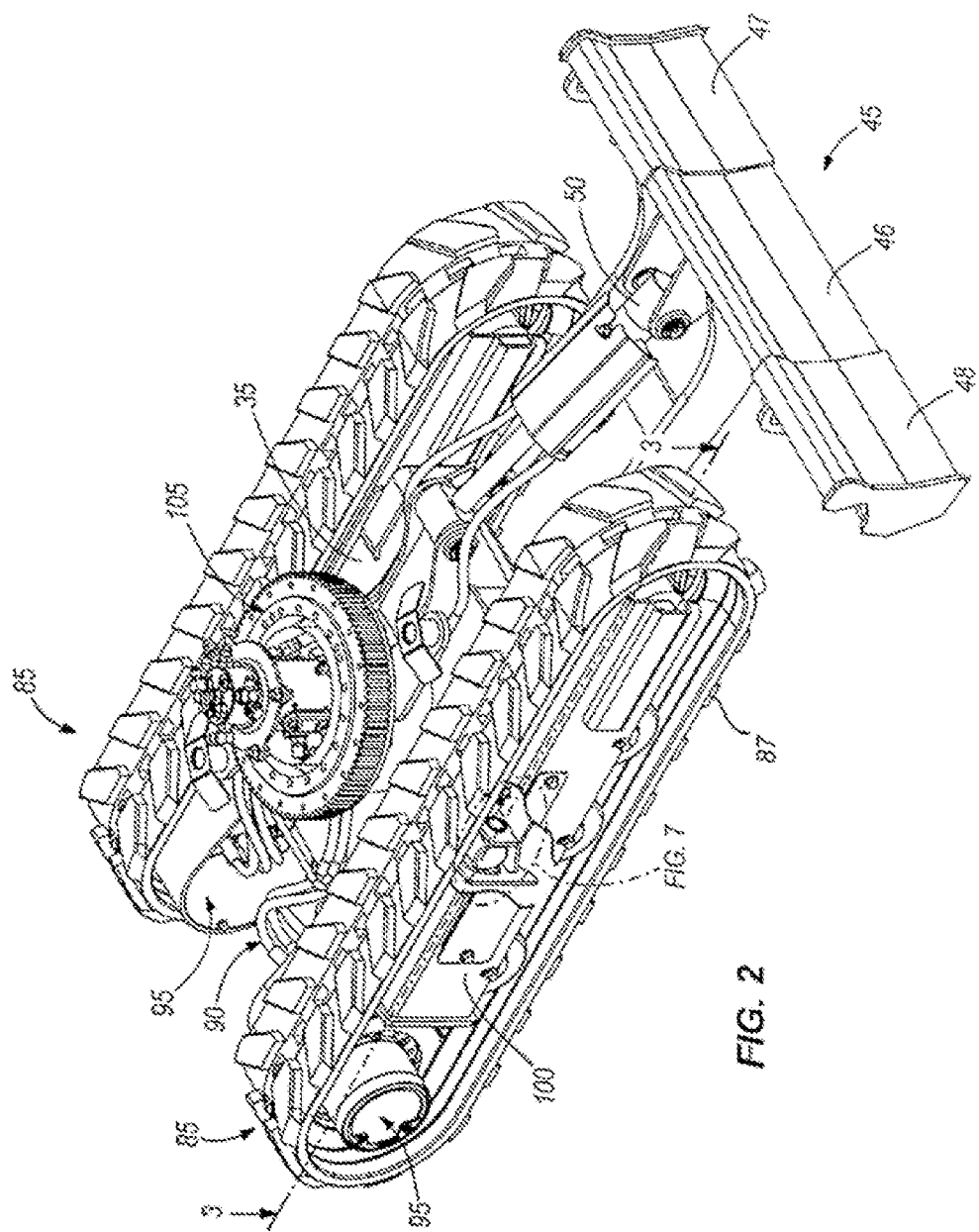
FIG. 2 is a perspective view of an undercarriage frame of the vehicle of FIG. 1.

FIG. 2 shows the excavator 10 with multiple parts removed to more clearly illustrate the frame member 35. The excavator 10 further includes a bearing assembly 105 coupled to the frame member 35. The bearing assembly 105 is coupled to and drives rotation of the operator support 30 relative to the frame member 35 about a vertical axis. The illustrated bearing assembly 105 is coupled to a plurality of hydraulic conduits 90 for operational power.

Figure 3:
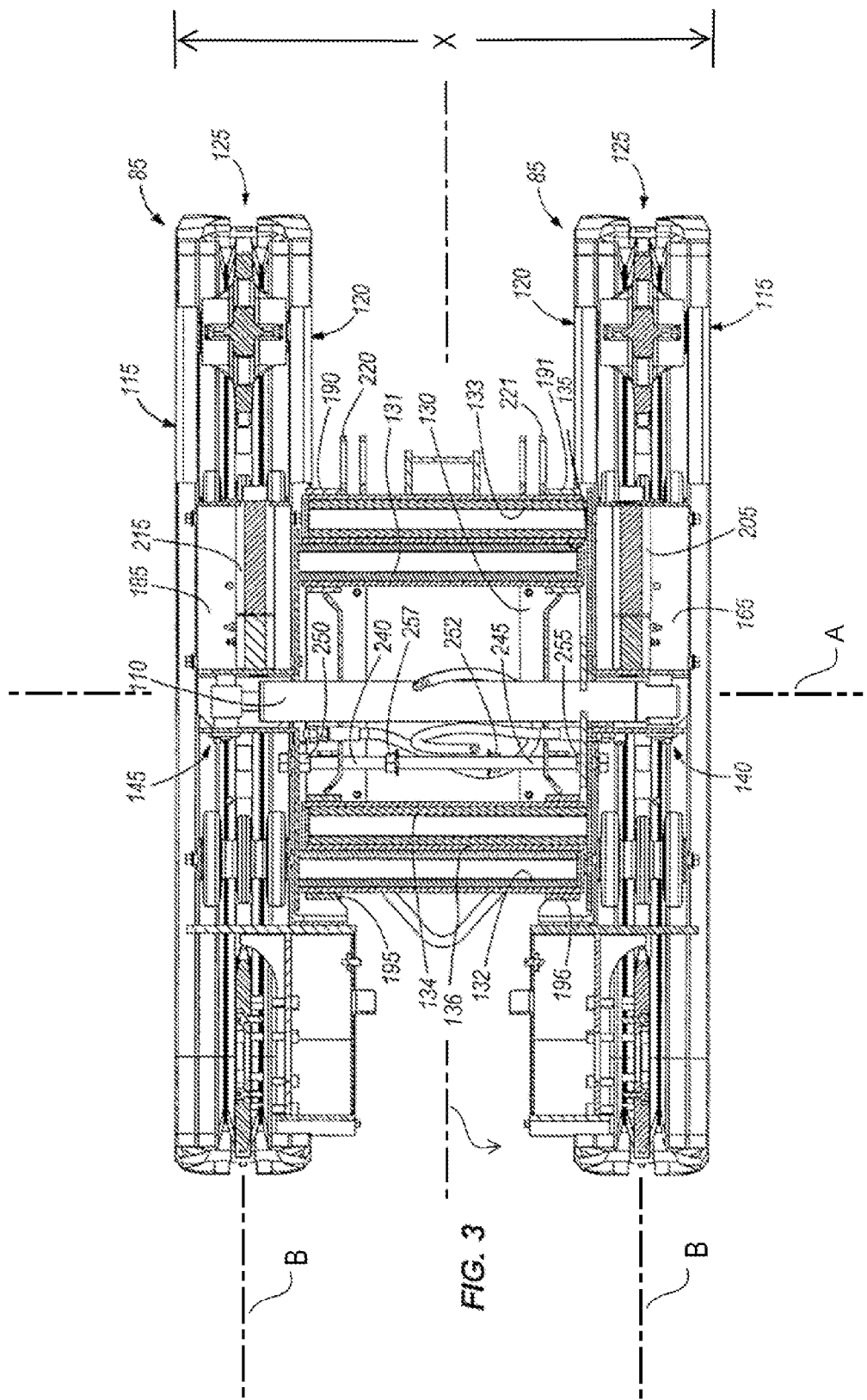
FIG. 3 is a cross section view of the undercarriage frame of FIG. 2 in a first configuration taken along line 3-3.
Figure 4:
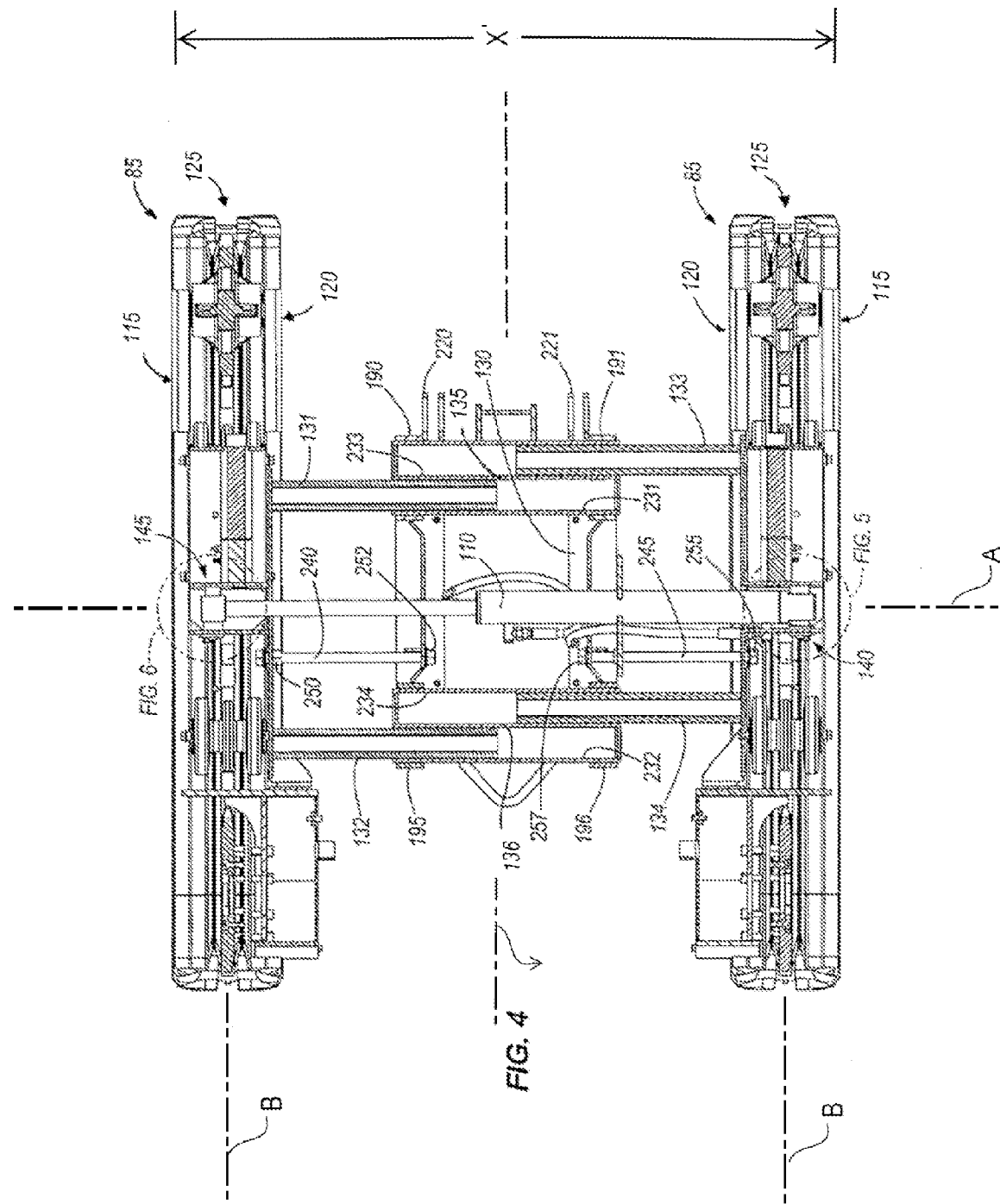
FIG. 4 is a cross section view of the frame of FIG. 2 in a second configuration taken along line 3-3.

Referring now to FIGS. 3 and 4, an adjustment mechanism, in the form of a double acting hydraulic cylinder 110, is coupled to both of the track assemblies 85 and extends approximately perpendicular to the track assemblies 85. The double-acting cylinder 110 can be extended or retracted along an axis A approximately perpendicular to parallel longitudinal axes B of the track assemblies 85 to adjust the distance between the track assemblies 85. The double-acting cylinder 110 is operable to move the track assemblies 85 laterally with respect to one another between a first or retracted configuration, as shown in FIG. 3 and a second or extended configuration, as shown in FIG. 4. In the retracted configuration, an outer width of the track assemblies 85, indicated at X in FIG. 3, is reduced. The first configuration is used to travel through narrow passages, such as fence gates or doorways. In the extended configuration, the outer width of the track assemblies 85, indicated at X' in FIG. 4, is greater than the width X in the retracted configuration. The extended configuration is used while operating to provide greater stability of the excavator 10 while digging, lifting, pushing etc.

FIGS. 3 and 4 show the track assemblies 85, each of which includes an outer portion 115 and an inner portion 120 and a middle portion 125 positioned therebetween. The inner portions 120 are positioned closer to a central longitudinal axis V of the vehicle 10 and the outer portions 115 are positioned further away from axis V. By "middle", it is meant that the middle portion 125 is located between the outer portion 115 and the inner portion 120 along the first axis A. The double-acting cylinder 110 is coupled to the track assemblies 85 at the middle portion 125. In other words, the double acting cylinder 110 is coupled to each of the track assemblies 85 farther from the central axis V of the vehicle 10 than the inner portion of each track assembly 85.

The frame member 35 includes a lower frame member 130 positioned between the track assemblies 85 and at least partially surrounding the double-acting cylinder 110. First and second left elongate members 131, 132 are coupled to the left track assembly 85 and extend toward the right track assembly 85 parallel to the axis A. The first and second left elongate members 131, 132 are at least partially supported by the lower frame member 130. The first and second right elongate members 133, 134 are coupled to the right track assembly 85 and extend toward the left track assembly 85 parallel to the axis A. The first and second right elongate members 133, 134 and are at least partially supported by the lower frame member 130. The first left and right elongate members, 131, 133 are adjacent one another and the second left and right elongate members 132, 134 are also adjacent one another, but spaced from the first left and right elongate members 131, 133 along the central axis V. The first left and right elongate members 131, 133 are positioned proximate the front of the excavator 10 forward of the cylinder. The second left and right elongate members 132, 134 are positioned proximate the rear of the excavator 10 rearward of the cylinder 110.

Figure 5:
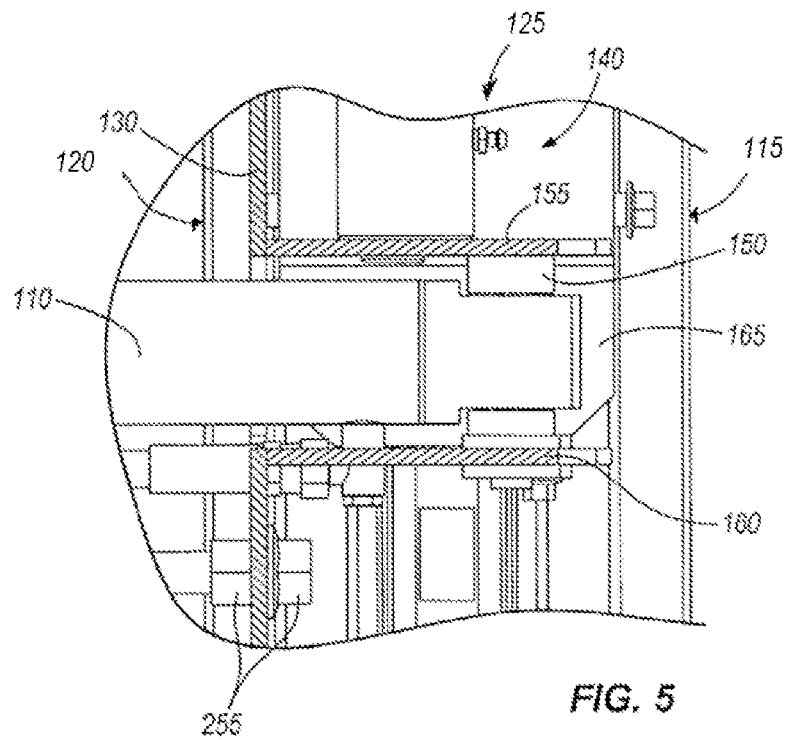
FIG. 5 is a close up view of a first connection of the frame of FIG. 4.
Figure 7:
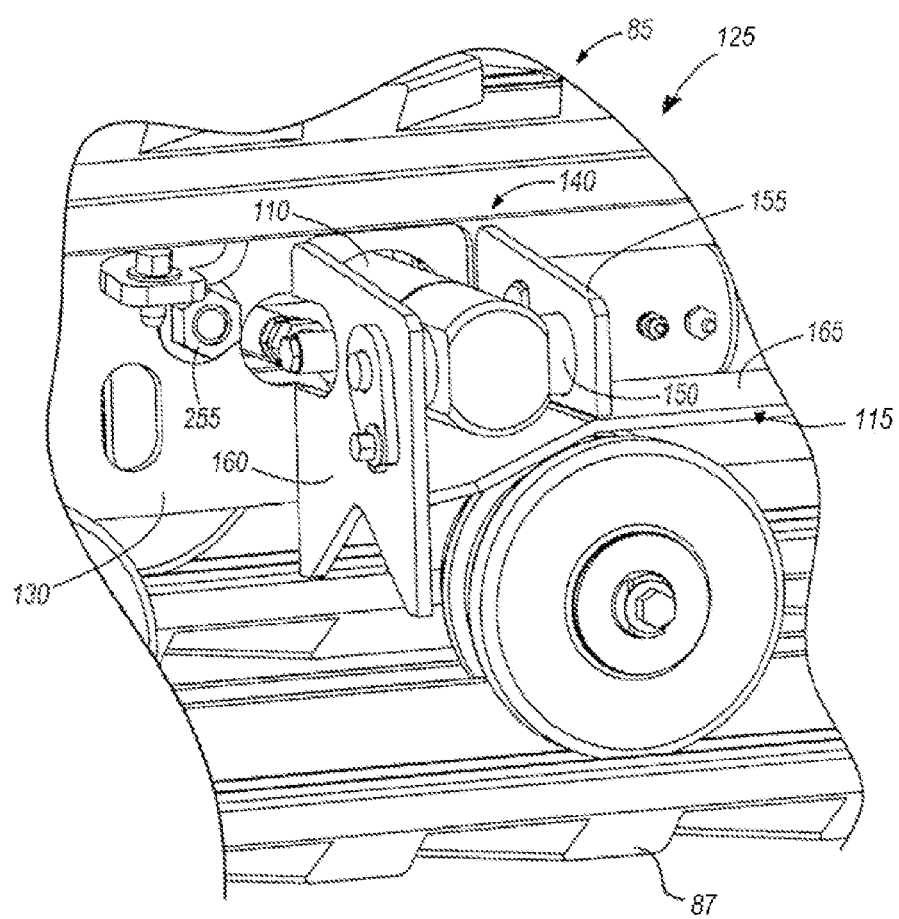
FIG. 7 is a close up view of the second connection of the frame of FIG. 2.

FIGS. 5 and 7 illustrate the connection between a piston end 140 of the double-acting cylinder 110 and the track assembly 85. The piston end 140 is movably coupled to the track frames 85 and extends through the lower frame member 130. When the vehicle 10 travels over uneven terrain, the track assembly 85 is moveable relative to the cylinder 110 to permit the position of the track assembly 85 to adjust in response to the terrain. In the illustrated embodiment, the piston end 140 is coupled to and pivotable about a first pin 150. The first pin 150 extends between first and second flanges 155, 160 on the track assembly 85. The first and second flanges 155, 160 are coupled to the track frames 85 and extend through the lower frame member 130. The first and second flanges 155, 160 extend substantially parallel to the cylinder 110, and extend from the outer portion 115 toward the inner portion 120 of the track assembly 85. A first support frame member 165 is coupled to the first and second flanges 155, 160 to further support the flanges 155, 160. In the illustrated embodiment, the first support frame member 165 is coupled to a lower portion of the first flange 155 and a middle portion of the second flange 160. The illustrated second flange 160 includes two protruding tooth-like portions that extend downward from the middle portion.

Figure 6:
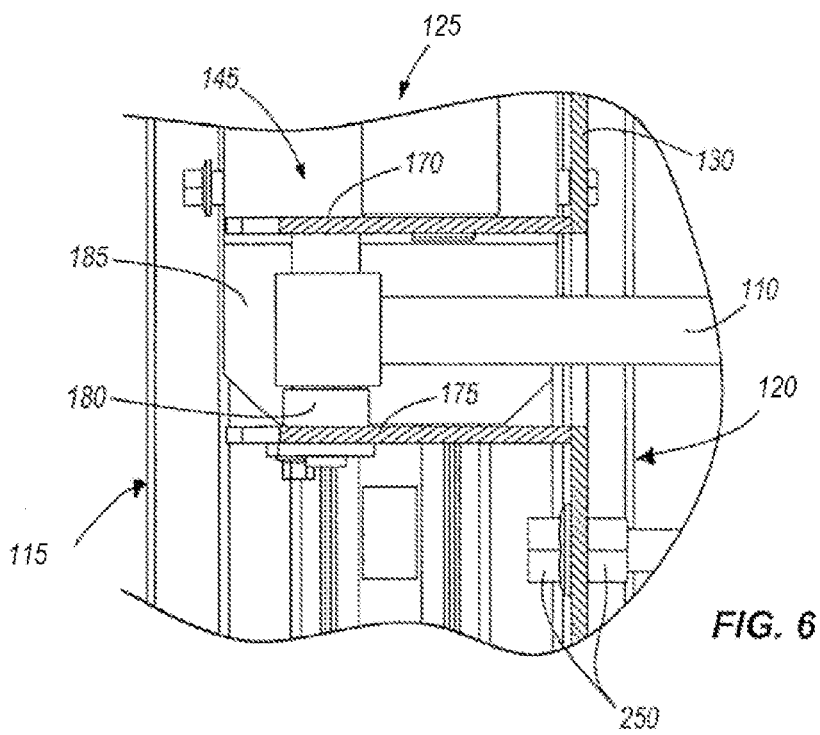
FIG. 6 is a close up view of a second connection of the frame of FIG. 4.

FIG. 6 illustrates the coupling configuration between a rod end 145 of the double-acting cylinder 110 and the track assembly 85. Third and fourth flanges 170, 175 are coupled to the lower frame member 130 and support the rod end 145 of the cylinder 110. The rod end 145 of the cylinder 110 is pivotably coupled to a second pin 180 extending between the flanges 170, 175. When the vehicle 10 travels over uneven terrain, the track assembly 85 is movable relative to the cylinder 110 to permit the position of the track assembly 85 to adjust in response to the terrain. In particular, as both ends of the cylinder 110 are pivotably coupled to the respective track assemblies 85, the left and right track assemblies 85 are each movable relative to one another along a substantially vertical axis to accommodate uneven terrain. As in FIGS. 5 and 7, the flanges 170, 175 extend substantially parallel to the cylinder 110 and extend from the outer portion 115 toward the inner portion 120 of the track assembly 85. A second support frame member 185 is coupled to the third and fourth flanges 170, 175 and the lower frame member to further support the flanges 170, 175. Although not specifically illustrated, the second support frame member 185 is coupled to a lower portion of the third flange 170 and a middle portion of the fourth flange 175. The fourth flange 175 can include two protruding tooth-like portions that extend downward from the middle portion.

Figure 8:
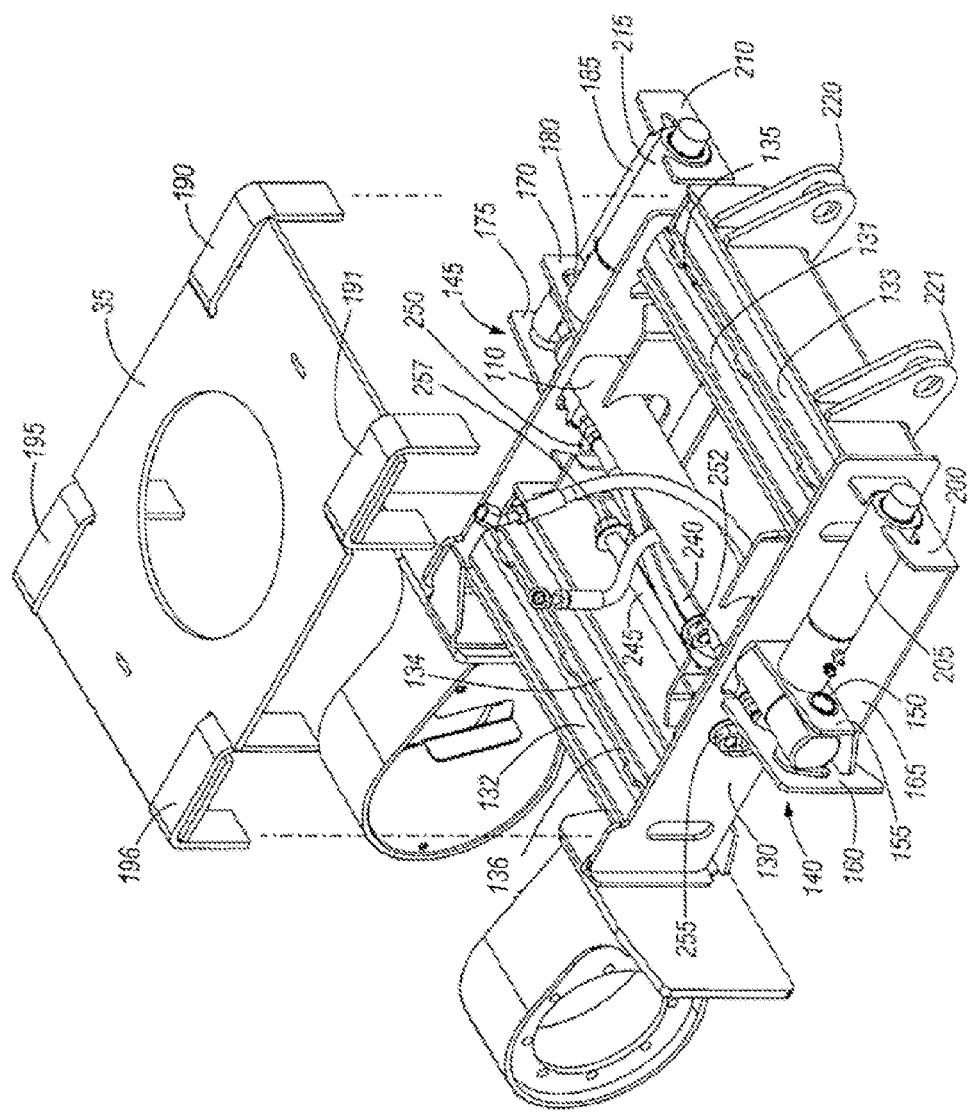
FIG. 8 is a perspective view of the frame of the vehicle in the first configuration with a cover exploded for clarity.

FIG. 8 illustrates the frame member 35 exploded off the lower frame member 130. The frame member 35 includes a front pair and a rear pair of downwardly-extending U-shaped bars, 190, 191 and 195, 196, respectively. The front pair of U-shaped bars 190, 191 are positioned proximate the first left and right frame members 131, 133. The rear pair of U-shaped bars 195, 196 are positioned proximate the second left and right frame members 132, 134. The U-shaped bars 190, 191, 195, 196 engage the lower frame member 130 and are supported by the lower frame member 130.

Figure 9:
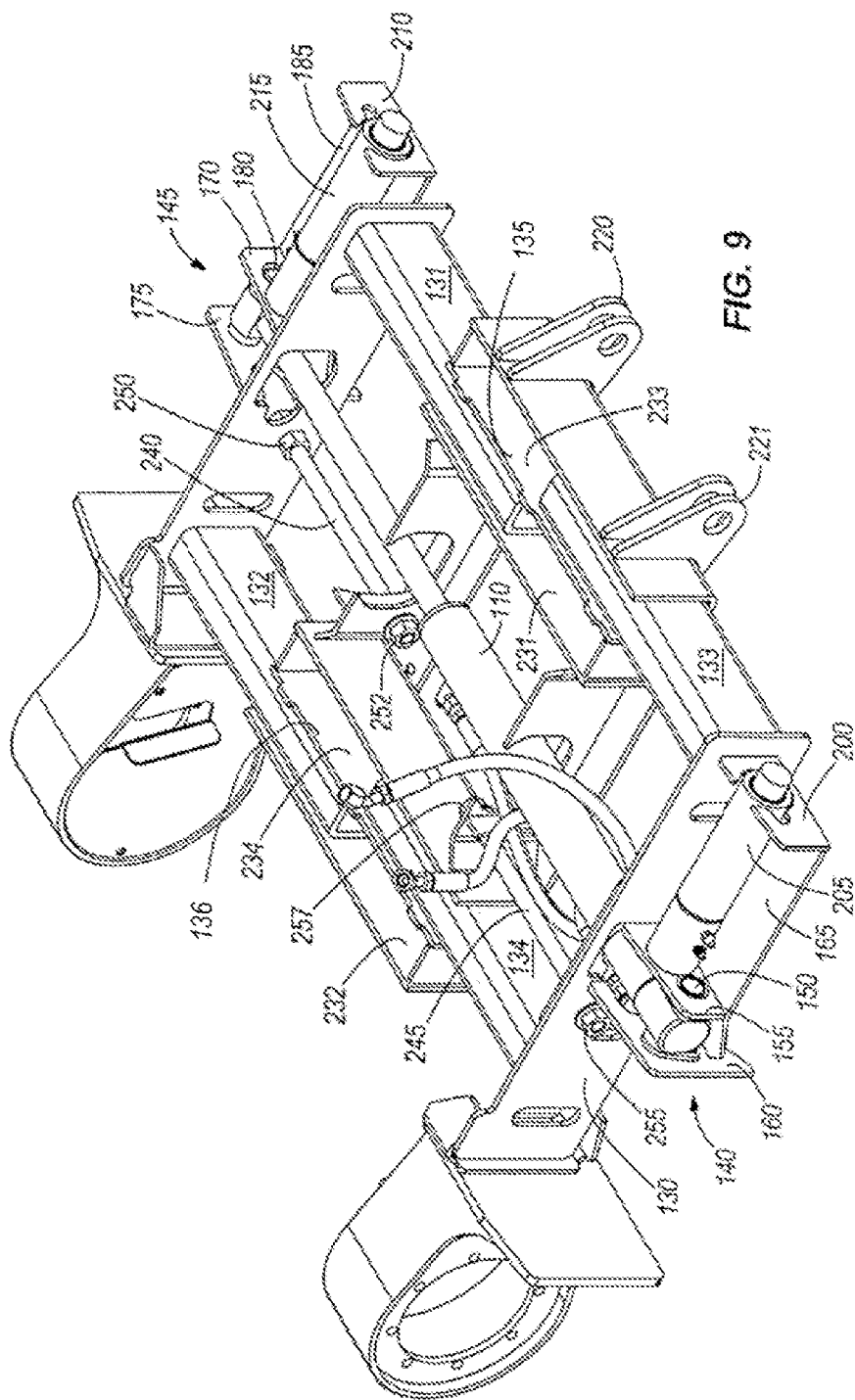
FIG. 9 is a perspective view of the frame of the vehicle in the second configuration with the cover removed for clarity.

As illustrated in FIGS. 8 and 9, the first support frame member 165 includes a right front flange 200 that extends upward from a front portion of the frame member 165. A right cylinder 205 is coupled between the first flange 155 and the right front flange 200. In some embodiments, the right cylinder 205 can be used to adjust the track tension for each track assembly 85. In other embodiments, the right cylinder 205 can be used as a suspension system that can permit the track assemblies 85 to adjust to varying terrain. Similarly, the second support frame member 185 can include a left front flange 210 that extends upward from a front portion of the frame member 185. A left cylinder 215 can be coupled between the third flange 170 and the left front flange 210. The left cylinder 215 can function in a similar manner as described above with respect to the right cylinder 205.

As shown in FIGS. 3, 4, 8 and 9, left and right protrusions 220, 221 are coupled to a front portion of the frame member 35 and extend forward. The front left and right U-shaped bars 190, 191 abut against the respective left and right protrusions 220, 221. The protrusions 220, 221 are used as connection points for the dozer blade 45 or other similar front attachment. The protrusions 220, 221 can strengthen the frame members 35 of the excavator 10.

As shown in FIGS. 4 and 9, the elongate members 131, 132, 133, 134 slide along channels or guides in lower frame member 130. Specifically, the first left elongate member 131 slides along a first left channel 231, the second left elongate member 132 slides along a second left channel 232. The first right elongate member 133 slides along a first right channel 233, and the second right elongate member 134 slides along a second right channel 234. The elongate members 131, 132, 133, 134 slide along the channels 231, 232, 233, 234 to maintain alignment of the track assemblies 85 and to support the double-acting cylinder 110. The elongate members 131, 132, 133, 134 can partially lift out of an open upper end of the channels 231, 232, 233, 234 upon pivoting of the double-acting cylinder 110 with respect to the track assemblies 85 about pins 150, 180.

A first wall member 135 is coupled to lower frame member 130 and is positioned between the first left elongate member 131 and the first right elongate member 133. A second wall member 136 is coupled to the lower frame member 130 and is positioned between the second left elongate member 132 and the second right elongate member 134. In the illustrated embodiment, the elongate members 131, 132, 133, 134 and the channels 231, 232, 233, 234 have a substantially square or rectangular cross-section. In other embodiments, circular, ovular, semi-circular, triangular and other regular or irregular shapes are possible for the cross section of the frame members 131, 132, 133, 134 and the channels 231, 232, 233, 234.

Left and right stop members 240, 245 extend between the left and right track assemblies 85 to limit movement in the expansion direction. The stop members 240, 245 are shown in the retracted configuration in FIGS. 3 and 8, and in the extended configuration in FIGS. 4 and 9. The stop members 240, 245 include an elongate member with a pair of nuts 250, 252, 255 and 257 at each end. The nuts 250, 252, 255 and 257 engage a portion of the lower frame member 130 to mechanically limit expansion.

When the track assemblies 85 are in the retracted position, the elongate members 131, 132, 133, 134 abut against the ends of respective channels 231, 232, 233, 234. The ends of the channels 231, 232, 233, 234 mechanically limit the retraction of the track assemblies 85. The stop members 240, 245 can be provided with additional nuts along the length of the stop members 240, 245 to limit retraction in addition to or in lieu of using the ends of the channels 231, 232, 233, 234 to limit retraction. Nut 250 is positioned on stop member 240 and nut 255 is positioned on stop member 245 to abut against the lower frame member 130 when fully extended.

In operation, the excavator 10 can operate in the extended configuration to provide greater stability during digging, lifting etc. When an operator desires to move the excavator 10 through a doorway, gate or other narrow passageway, the cylinder 110 retracts along the axis A, which exerts an inwardly directed force (i.e., towards the central axis V, as shown on FIGS. 3 and 4) on the pins 150 and 180 to thereby pull the track assemblies 85 inward. The elongate members 131, 132, 133, 134 slide inward along respective channels 231, 232, 233, 234 as the distance between the track assemblies 85 decreases, thereby guiding uniform lateral movement of the track assemblies 85 forward and rearward of the cylinder 110. The elongate members 131, 132, 133, 134 abut against the respective ends of channels 231, 232, 233, 234 when the excavator 10 reaches the retracted configuration. Although the retracted configuration is illustrated in FIG. 3 as being the fullest retraction of the cylinder 110, the track assemblies 85 can be adjusted to an intermediate configuration (i.e., retracted, but not fully so) for traveling through narrow passageways.

When the excavator 10 has passed through the narrow passageway and the operator requires greater stability, the cylinder 110 exerts an outwardly directed force along the axis A against the pins 150, 180 to thereby push the track assemblies 85 outward, away from the central axis V. The elongate members 131, 132, 133, 134 slide outward along respective channels 231, 232, 233, 234 as the distance between the track assemblies 85 increases. The nuts 250, 252, 255 and 257 on the respective stop members 240, 245 abut against the lower frame member 130 when the track assemblies 85 are fully extended. Although the extended configuration is illustrated in FIG. 4 as being the fullest extension of the cylinder 110, the track assemblies 85 can be adjusted to an intermediate configuration (i.e., extended, but not fully so) for traveling through stable usage of the excavator.

Referring now to FIGS. 3 and 4, the distance between the outer portions 115 of the track assemblies 85 defines the track assembly outer width X/X'. The track assembly outer width X/X' can be the widest point of the vehicle 10 (i.e., the track assembly outer width X/X' can determine the greatest width or overall width of the vehicle 10). When the track assemblies 85 are in the extended or wider configuration, the track assembly outer width is X', providing the operator with increased stability for using the attachments and traveling over rough ground. Sometimes, however, it is desirable to move the excavator 10 through a narrow opening, such as a gate or doorway. For example, the standard width of an interior doorway in the United States is about 30 to about 32 inches, while the standard width of an exterior doorway in the United States is about 36 inches. Therefore, by reducing the track assembly outer width in the retracted configuration to X, as illustrated in FIG. 3, the overall width of the excavator 10 can be reduced to X.

In one embodiment, the track assembly width X when the track assemblies 85 are in the retracted configuration is from about 700 mm (27.5") to about 800 mm (31.5"). In another embodiment, the track assembly width X when the track assemblies 85 are in the retracted configuration is about 700 mm (27.5"). In another embodiment, the track assembly width X when the track assemblies 85 are in the retracted configuration is about 710 mm (28"). In another embodiment, the track assembly width X when the track assemblies 85 are in the retracted configuration is about 730 mm (28.7"). In another embodiment, the track assembly width X when the track assemblies 85 are in the retracted configuration is about 800 mm (31.5"). With respect to the foregoing embodiments, the exemplary track assembly width X in the retracted configuration can also be the maximum overall width of the vehicle 10 with the track assemblies 85 in the retracted configuration. These dimensions are given by way of example only and are not intended to be construed as limiting to the claims.

In one embodiment, the track assembly width X' when the track assemblies 85 are in the extended configuration is from about 710 mm (28") to about 915 mm (36"). In one embodiment, the track assembly width X' when the track assemblies 85 are in the extended configuration is about 710 mm (28"). In one embodiment, the track assembly width X' when the track assemblies 85 are in the extended configuration is about 730 mm (28.7"). In one embodiment, the track assembly width X' when the track assemblies 85 are in the extended configuration is about 800 mm (31.5"). In one embodiment, the track assembly width X' when the track assemblies 85 are in the extended configuration is about 915 mm (36"). These dimensions are given by way of example only and are not intended to be construed as limiting to the claims.

In some embodiments, the adjustment mechanism includes a plurality of double acting cylinders. Additional double acting cylinders can be spaced apart from one another along the central axis V to provide additional force for moving the track assemblies 85 inward and outward. In some embodiments, the adjustment mechanism is in the form of a plurality of single-acting cylinders. In these embodiments, the first single-acting cylinder exerts an outwardly directed force on the track assemblies 85 to increase the overall width of the vehicle 10, whereas the second single-acting cylinder exerts an inwardly directed force on the track assemblies 85 to decrease the overall width of the vehicle 10.

Various features and advantages of the invention are set forth in the following claims.

What is claimed is:

1. An undercarriage for an excavator having a frame with first and second sides, comprising:

a first track assembly configured to be positioned on the first side of the frame and including a first track and a drive track unit for driving movement of the first track, the first track assembly having:
 an inner portion, an outer portion, and a middle portion between the inner portion and the outer portion;
 a first flange and a second flange spaced apart from the first flange, the first and second flanges extending from the inner portion to the outer portion and defining a gap therebetween; and
 a pin extending across the gap from the first flange to the second flange;

a second track assembly configured to be positioned on the second side of the frame and including a second track and a drive track unit for driving movement of the second track, the second track assembly having an inner portion, an outer portion, and a middle portion between the inner portion and the outer portion, the second track assembly being spaced apart from first track assembly along a first axis; and an adjustment mechanism coupled to the first track assembly and to the second track assembly, wherein the adjustment mechanism is pivotably coupled to the pin of the first track assembly, the adjustment mechanism being capable of extending and retracting along an axis parallel to the first axis to increase and decrease the spacing between the first track assembly and the second track assembly along the first axis, wherein the adjustment mechanism comprises a double-acting hydraulic cylinder, the double-acting hydraulic cylinder being pivotally coupled to both the middle portion of the first track assembly and the middle portion of the second track assembly;

a first elongate member coupled to the first track assembly and extending toward the second track assembly parallel to the first axis; and a first channel configured to be coupled to the frame and to extend toward the first track assembly, the first elongate member being slidably received in the first channel, the first channel restraining sliding movement of the first elongate member to the first axis.

2. The undercarriage of claim 1, wherein the piston and rod ends of the adjustment mechanism are pivotably coupled to the first and second track assemblies such that the first and second track assemblies are movable relative to each other along a substantially vertical axis to accommodate uneven terrain.

3. The undercarriage of claim 1, wherein the first and second track assemblies are movable under the influence of the adjustment mechanism between a first configuration and a second configuration, wherein in the first configuration the undercarriage has a first outer width along the first axis and in the second configuration the undercarriage has a second outer width along the first axis that is greater than the first width.

4. The undercarriage of claim 3, wherein the first outer width is from about 700 mm (27.5") to about 800 mm (31.5").

5. The undercarriage of claim 3, wherein the second outer width is from about 710 mm (28") to about 915 mm (36").

6. The undercarriage of claim 1, further comprising:

a second elongate member coupled to the second track assembly and extending toward the first track assembly parallel to the first axis; and a second channel configured to be coupled to the frame and extending toward the second track assembly, the second elongate member being slidably received in the second channel, the second channel restraining sliding movement of the second elongate member to the first axis.

7. The undercarriage of claim 1 and further comprising:
a first stop member attached to the first track assembly and configured to engage the frame to limit extension of the first track assembly with respect to the frame.

8. The undercarriage of claim 7 and further comprising:
a second stop member attached to the second track assembly and configured to engage the frame to limit extension of the second track assembly with respect to the frame.

9. A construction vehicle comprising:
a frame;
an operator support supported on the frame for rotation relative to the frame about a vertical axis;
an upper attachment pivotably mounted to the frame; and
an undercarriage for supporting the frame for movement over the ground,
  the undercarriage including:
  a first track assembly including a first track and a drive track unit for driving movement of the first track, the first track assembly having:
    an inner portion, an outer portion, and a middle portion between the inner portion and the outer portion;
    a first flange and a second flange spaced apart from the first flange, the first and second flanges extending from the inner portion to the outer portion and defining a gap therebetween; and
    a pin extending across the gap from the first flange to the second flange;
  a second track assembly including a second track and a drive track unit for driving movement of the second track, the second track assembly having an inner portion, an outer portion, and a middle portion between the inner portion and the outer portion, the second track assembly being spaced apart from the first track assembly along a first axis; and
  an adjustment mechanism coupled to the first track assembly and to the second track assembly, wherein the adjustment mechanism is pivotably coupled to the pin of the first track assembly, the adjustment mechanism being capable of extending and retracting along an axis parallel to the first axis to increase and decrease the spacing between the first track assembly and the second track assembly along the first axis, wherein the adjustment mechanism comprises a double-acting hydraulic cylinder, the double-acting hydraulic cylinder being pivotably coupled to both the middle portion of the first track assembly and the middle portion of the second track assembly;
  a first elongate member coupled to the first track assembly and extending toward the second track assembly parallel to the first axis; and
  a first channel coupled to the frame and extending toward the first track assembly, the first elongate member being slidably received in the first channel, the first channel restraining sliding movement of the first elongate member to the first axis.

10. The construction vehicle of claim 9, wherein the piston and rod ends of the adjustment mechanism are pivotably coupled to the first and second track assemblies such that the first and second track assemblies are movable relative to each other along a substantially vertical axis to accommodate uneven terrain.

11. The construction vehicle of claim 9, wherein the track assemblies are movable under the influence of the adjustment mechanism between a first configuration and a second configuration, wherein in the first configuration the undercarriage has a first outer width along the first axis and in the second configuration the undercarriage has a second outer width along the first axis that is greater than the first width.

12. The construction vehicle of claim 11, wherein the first outer width is from about 700 mm (27.5") to about 800 mm (31.5") and the second outer width is from about 710 mm (28") to about 915 mm (36").

13. The construction vehicle of claim 11, wherein the first outer width defines an overall width of the vehicle along the first axis in the first configuration.

14. The construction vehicle of claim 9, further comprising:
a second elongate member coupled to the second track assembly and extending toward the first track assembly parallel to the first axis; and
a second channel coupled to the frame and extending toward the second track assembly, the second elongate member being slidably received in the second channel, the second channel restraining sliding movement of the second elongate member to the first axis.

15. The construction vehicle of claim 9 and further comprising:
a stop member attached to the first track assembly and capable of engaging the frame to limit extension of the first track assembly with respect to the frame.

16. An undercarriage for a construction vehicle having a frame with first and second sides, comprising:
a first track assembly configured to be positioned on the first side of the frame and including a first track and a first drive track unit for driving movement of the first track, the first drive track unit having:
  an inner portion, an outer portion, and a middle portion between the inner portion and the outer portion and wherein the first track surrounds the first drive track unit;
  a first flange and a second flan e spaced apart from the first flange, the first and second flanges extending from the inner portion to the outer portion and defining a gap therebetween; and
  a pin extending across the gap from the first flange to the second flange, wherein the adjustment mechanism is pivotably coupled to the pin;
a second track assembly configured to be positioned on the second side of the frame and including a second track and a second drive track unit for driving movement of the second track, the second drive track unit having an inner portion, an outer portion, and a middle portion between the inner portion and the outer portion and wherein the second track surrounds the second drive track unit, the second track assembly being spaced apart from first track assembly along a first axis; and
an adjustment mechanism coupled to the first track assembly and to the second track assembly, the adjustment mechanism being capable of extending and retracting along an axis parallel to the first axis to increase and decrease the spacing between the first track assembly and the second track assembly along the first axis, wherein the adjustment mechanism comprises a double-acting hydraulic cylinder, the double-acting hydraulic cylinder being pivotally coupled to both the middle portion of the first drive track unit and the middle portion of the second drive track unit;
a first elongate member coupled to the first track assembly and extending toward the second track assembly parallel to the first axis; and
a first channel configured to be coupled to the frame and to extend toward the first track assembly, the first elongate member being slidably received in the first channel, the first channel restraining sliding movement of the first elongate member to the first axis.

\* \* \* \* \*